Dec. 10, 1935.  W. C. SANDERS  2,023,856
GENERATOR DRIVING AXLE
Filed Dec. 26, 1933
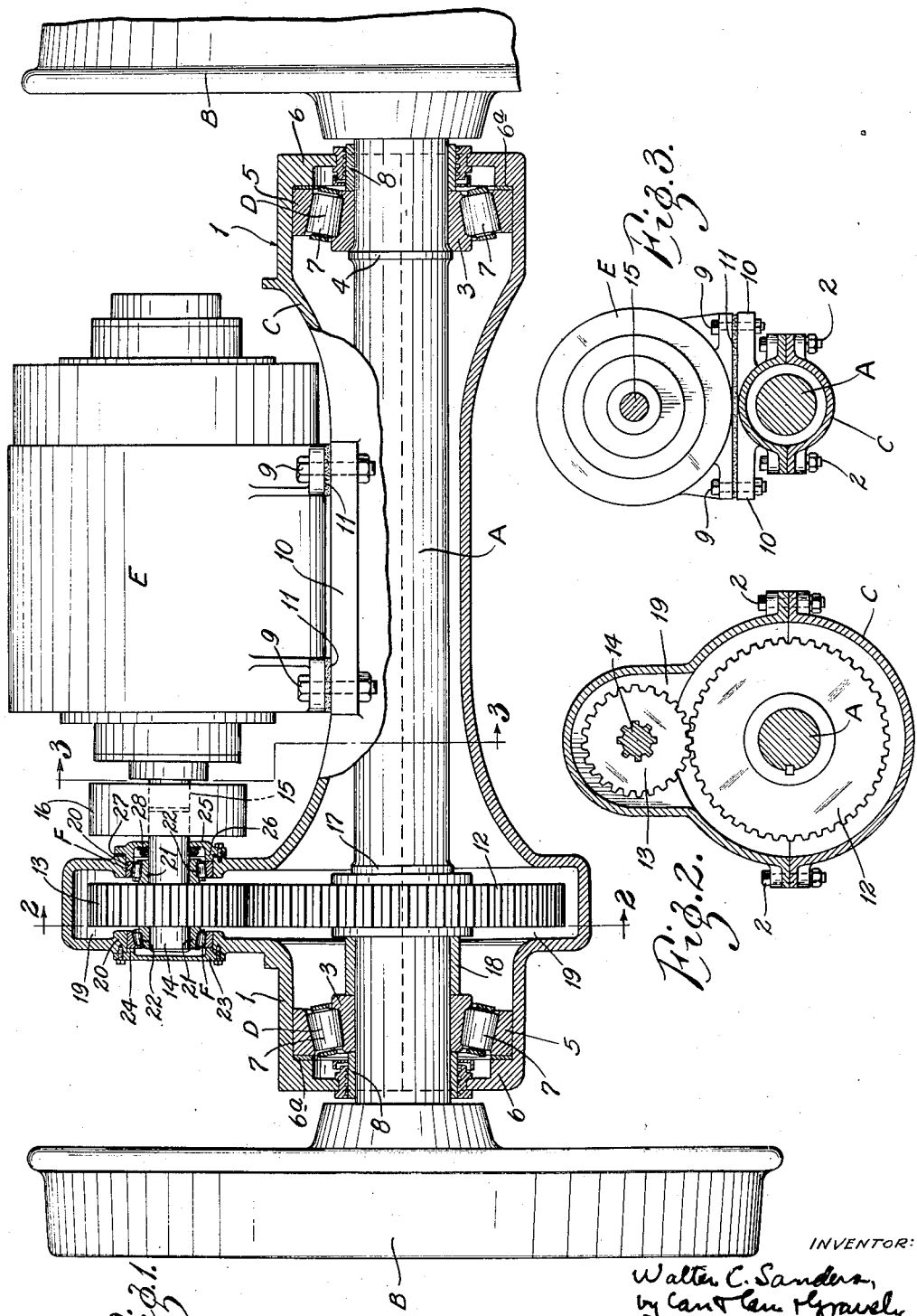
INVENTOR:
Walter C. Sanders,
by Cant+en +Gravely,
HIS ATTORNEYS.

Patented Dec. 10, 1935

2,023,856

UNITED STATES PATENT OFFICE 2,023,856

GENERATOR DRIVING AXLE

Walter C. Sanders, Canton, Ohio, assignor to The Timken Roller Bearing Company, Canton, Ohio, a corporation of Ohio Application December 26, 1933, Serial No. 703,868

8 Claims. (Cl. 105—113)

This invention relates to generator driving axles for railway car trucks, and more particularly to axles of the type that are provided with axle housings of the inboard type. The invention has for its principal objects to provide for the mounting of the generator on the axle housing, to provide a direct drive between the axle and the generator, to provide for enclosing the generator driving mechanism within the axle housing, and to provide for simplicity and cheapness of construction and compactness of design. The invention consists in the generator driving axle and in the construction, combination and arrangement of parts hereinafter described and claimed.

In the accompanying drawing, which forms part of this specification and wherein like symbols refer to like parts wherever they occur, Fig. 1 is a vertical longitudinal section through a generator driving axle embodying my invention, the generator being shown in elevation, Fig. 2 is a vertical cross-section on the line 2—2 in Fig. 1; and Fig. 3 is a vertical cross-section on the line 3—3 in Fig. 1.

Referring to the accompanying drawing, my invention is shown in connection with a railway car axle construction of the kind comprising an axle A having wheels B on the ends thereof and provided with a load supporting axle housing C of the inboard type which extends lengthwise of the axle substantially from wheel to wheel thereof. The axle housing C is provided with enlarged end portions that form chambers in which are mounted tapered roller or other anti-friction bearings D. The tops of these enlarged end portions of the axle housing have substantially flat surfaces adapted to constitute seats 1 for the usual equalizers (not shown). As shown in the drawing, the axle housing C is preferably split lengthwise in a horizontal plane to form upper and lower half sections that are held together by bolts 2 that extend vertically through cooperating outstanding flanges on the two housing sections.

Each of the tapered roller bearings D comprises a cone 3 mounted on the axle A, a cup 5 seated in the enlarged end portion of the axle with its large end in abutting relation to an adjusting washer 6a interposed between said cup and an annular shoulder formed by an end closure flange 6 on said housing, and conical bearing rollers 7 interposed between said cup and said cone. An abutment sleeve 8 is mounted on the axle A against the outer or small end of the cone 3; and a suitable closure sleeve snugly fits around said abutment sleeve and is mounted against axial movement in the axle receiving opening in the end closure flange 6 of the axle housing C. The cone of the bearing at one end of the housing abuts against an annular shoulder 4 provided therefor on the axle.

Mounted on the axle housing C intermediate the ends thereof with its axis disposed parallel to the axle axis is an electric generator or dynamo E for supplying electric current for the electric lighting, air conditioning or mechanical refrigerator systems of the car. As shown in the drawing, the generator is seated on top of the axle housing C and is removably secured by bolts 9 to outstanding brackets 10 provided therefor on said housing. If desired, suitable cushioning pads 11 may be interposed between the generator and the supporting brackets therefor to provide a cushioned support for the generator.

The generator E is driven from the axle A preferably by means of a large spur driving gear 12 rotatable with said axle and a smaller driven spur gear 13 rotatable with a shaft 14, which is disposed in axial alinement with the end of the armature shaft 15 of said generator. The gear shaft 14 is connected by means of a suitable flexible coupling 16 to the armature shaft 15 and constitutes an extension thereof. The driving gear 12 is mounted on the axle A between an annular thrust rib 17 thereon and a spacer ring 18 mounted on said axle between said gear and the cone 3 of the adjacent taper rolling bearing.

The axle housing C is provided with an enlarged portion 19 which constitutes a chamber for the intermeshing gears 12 and 13. The enlarged gear receiving portion 19 of the axle housing C is provided with axially alined openings adapted to receive taper roller bearings F for rotatably supporting the ends of the gear shaft 14. Each of said bearings comprises a cup 20 mounted in one of said openings, a cone 21 fixed to the shaft 14 and conical bearing rollers 22 interposed between said cup and said cone. The bearing receiving opening in one wall of the gear receiving portion 19 of the axle housing is closed by means of a removable closure cap 23 that has a flange 24 fitting in said opening in abutting relation to the outer end of the adjacent bearing cup 20. The bearing receiving opening in the other wall of the gear receiving portion of the axle housing is closed by means of an annular closure member 25 that is removably secured to said wall and has an annular flange 26 in abutting relation to the large end of the adjacent bearing cone 21. The bearings F are adjusted by means of shims 27 interposed between the closure ring 25 and the wall of the gear receiving portion 19 of the axle housing; and a suitable oil seal 28 surrounds the gear shaft 14 inside of said closure ring.

The hereinbefore described generator driving axle construction has numerous advantages. It provides for mounting the generator directly on the axle housing where it can be driven directly from the axle and thus dispenses with the belt and flexible shaft drives required for driving the generator when the same is located on the truck or car body. It provides a direct, simple spur gear drive between the axle and generator; and it also provides an oil-tight and dust proof housing for the gearing. It also permits the generator to be mounted on and dismounted from the axle without disturbing the drive gearing therein.

Obviously, the hereinbefore described construction admits of considerable modification without departing from the invention. Therefore, I do not wish to be limited to the precise construction shown and described.

What I claim is:

1. A generator driving axle construction comprising an axle, a housing thereon horizontally split to form separable upper and lower sections, a generator mounted on top of the upper section of said housing, and gearing in said housing for driving said generator from said axle.

2. A generator driving axle construction comprising an axle, a load supporting housing for said axle, said housing being provided at its top with outstanding horizontally disposed brackets, a generator seated on and removably secured to said brackets, and a driving connection in said housing between said axle and said generator.

3. A generator driving axle construction comprising a wheeled axle, an inboard load supporting housing for said axle, a generator mounted on top of said housing with its axis disposed parallel to and substantially in the vertical plane of the axle axis, and a driving connection in said housing between said axle and said generator.

4. A generator driving axle construction comprising a wheeled axle, an inboard load supporting housing for said axle, a generator, and a driving connection in said housing between said axle and said generator, said generator being mounted on top of said housing with its axis disposed parallel to and substantially in the vertical plane of the axle axis.

5. A generator driving axle construction comprising a wheeled axle, an inboard load supporting housing for said axle, a generator mounted on top of said housing exteriorly thereof with its armature disposed parallel to and substantially in the vertical plane of the axle axis, a shaft mounted in said housing adjacent to one end of said armature, and a driving connection in said housing between said axle and said shaft.

6. A generator driving axle construction comprising a wheeled axle, an inboard load supporting housing for said axle, a generator mounted on top of said housing with its armature disposed parallel to the axle axis, a shaft mounted in said housing above said axle and adjacent to one end of said armature, a gear fixed to said axle, a gear fixed to said shaft and intermeshing with said axle gear, and a flexible coupling between said gear shaft and said armature.

7. A generator driving railway car axle construction comprising a wheeled axle, a load supporting inboard housing for said axle, anti-friction bearings interposed between said axle and said housing at both ends of the latter, a shaft journaled in said housing above said axle and adapted to be operatively connected to a generator to drive the same, and a driving connection between said axle and said shaft enclosed with said housing, said driving connection being located intermediate between the bearings in the ends of said housing.

8. A generator driving railway car axle construction comprising a wheeled axle, a housing surrounding said axle and extending substantially from wheel to wheel thereof and provided at its ends with seats for supporting a truck frame, anti-friction bearings interposed between said axle and said housing below said seats, a shaft journaled in said truck frame supporting housing above and adjacent to the inner end of one of said seats and adapted to be connected to a generator to drive the same, and gearing enclosed in said housing inwardly of said seat for driving said shaft from said axle.

WALTER C. SANDERS.